United States Patent
Alumbaugh et al.

(10) Patent No.: US 6,442,592 B1
(45) Date of Patent: Aug. 27, 2002

(54) MESSAGE CENTER SYSTEM

(75) Inventors: Wendell Alumbaugh, Southlake; Carmela Gay Munson, Arlington; Dennis Eugene Esters, Fort Worth; Yelena Braginsky, Plano; Mark Allen Kingston, Garland; Patti Jo Newsom, North Righland Hills, all of TX (US)

(73) Assignee: Micro Computer Systems, Inc., Irving, TX (US)

( * ) Notice: Subject to any disclaimer, the term of this patent is extended or adjusted under 35 U.S.C. 154(b) by 0 days.

(21) Appl. No.: 09/209,878

(22) Filed: Dec. 11, 1998

(51) Int. Cl.$^7$ .............................................. G06F 15/16
(52) U.S. Cl. ...................... 709/206; 709/200; 709/204; 709/207; 709/232; 709/238
(58) Field of Search ................................ 709/206, 200, 709/201, 204, 205, 207, 227, 238, 232, 246, 248, 249

(56) References Cited

U.S. PATENT DOCUMENTS

| | | | |
|---|---|---|---|
| 4,995,035 A | 2/1991 | Cole et al. .................. 370/95.2 |
| 5,109,519 A | 4/1992 | Zimmet et al. .............. 395/800 |
| 5,220,596 A | 6/1993 | Patel ............................ 379/94 |
| 5,245,532 A | 9/1993 | Mourier ...................... 364/400 |
| 5,261,052 A | 11/1993 | Shimamoto et al. ........ 395/200 |
| 5,263,082 A | 11/1993 | Kotake et al. ................ 379/93 |
| 5,265,033 A | 11/1993 | Vajk et al. ................... 364/514 |
| 5,299,255 A | 3/1994 | Iwaki et al. .................. 379/96 |
| 5,406,557 A | 4/1995 | Baudoin ....................... 370/61 |
| 5,424,724 A * | 6/1995 | Williams et al. ........ 240/825.05 |
| 5,428,784 A | 6/1995 | Cahill, Jr. .................... 395/650 |
| 5,452,447 A | 9/1995 | Nelson et al. ............... 395/650 |
| 5,459,454 A | 10/1995 | Nakano .................. 340/825.06 |
| 5,481,698 A | 1/1996 | Itoh et al. ............... 395/185.01 |
| 5,504,897 A | 4/1996 | Gans et al. .................. 395/650 |
| 5,508,817 A | 4/1996 | Kunigami .................... 358/402 |
| 5,530,739 A | 6/1996 | Okada et al. ................. 379/89 |
| 5,535,407 A | 7/1996 | Yanagawa et al. .......... 395/800 |
| 5,537,543 A | 7/1996 | Itoh et al. ............... 395/185.01 |
| 5,539,884 A | 7/1996 | Robrock, II ........... 395/200.12 |
| 5,548,506 A | 8/1996 | Srinivasan .............. 364/401 R |
| 5,557,736 A | 9/1996 | Hirosawa et al. ...... 395/182.02 |
| 5,564,018 A | 10/1996 | Flores et al. ........... 295/200.02 |
| 5,583,940 A | 12/1996 | Vidrascu et al. .............. 380/49 |
| 5,613,108 A | 3/1997 | Morikawa .................... 393/616 |
| 5,627,764 A | 5/1997 | Schulzman et al. ..... 364/514 R |
| 5,632,011 A | 5/1997 | Landfield et al. ........... 395/326 |
| 5,632,018 A | 5/1997 | Otorii ..................... 395/200.04 |
| 5,905,863 A * | 5/1999 | Knowles et al. ............ 709/206 |
| 6,018,762 A * | 1/2000 | Brunson et al. ............ 709/206 |
| 6,021,428 A * | 2/2000 | Miloslavsky ................ 709/206 |
| 6,249,807 B1 * | 6/2001 | Shaw et al. ................. 709/206 |

* cited by examiner

*Primary Examiner*—Ario Etienne
(74) *Attorney, Agent, or Firm*—Bracewell & Patterson, L.L.P.

(57) ABSTRACT

A message center server retrieves e-mail messages from one or more e-mail accounts and intelligently distributes them among a plurality of agents handling the messages. Messages received from the same originator regarding the same subject matter are treated as transactions and assigned a unique transaction identifier. When a message initiating a new transaction is forwarded to an agent, the agent's login is associated with the transaction identifier for that message. Thereafter, messages retrieved from the e-mail account(s) are scanned for a transaction identifier. If found, the message—a continuance of the transaction—is placed in the appropriate agent queue. The same agent thus handles all messages from the originator regarding a specific transaction, avoiding the need to relearn a transaction history. If no transaction identifier is found, the message is forwarded to an appropriate pool of new messages.

Agents retrieve messages from a pool by a fetch request, which includes a fetch count or minimum number of messages desired. Agents may thus retrieve a number of messages, prepare responses, and send the prepared responses back to the message center server. Messages from an agent's queue—transaction continuances—are forwarded first in response to a fetch request, followed by the oldest new messages from a designated pool. Performance indicators such as the number of agents available, the number of messages being handled by an agent, and the number of new messages in a pool may be monitored by supervisors.

17 Claims, 8 Drawing Sheets

MESSAGE CENTER SYSTEM

BACKGROUND OF THE INVENTION

1. Technical Field

The present invention relates generally to electronic mail handling in data processing system networks and in particular to handling electronic mail for accounts which are monitored by multiple individuals. Still more particularly, the present invention relates to intelligently distributing electronic mail for enterprise general accounts among a plurality of individuals designated to respond to such electronic mail.

2. Description of the Related Art

Data processing system networks which provide electronic mail (e-mail) services, particularly those providing e-mail services to and from the Internet, commonly employ Simple Mail Transport Protocol (SMTP) e-mail servers to relay e-mail messages. E-mail messages for a client within a particular enterprise and/or local area network (LAN) are generally accumulated at an SMTP server for the enterprise/LAN. The e-mail client periodically queries the enterprise SMTP server to retrieve messages intended for that client. Typically one of two protocols—the Post Office Protocol ("POP," the most popular version of which is version three or "POP3") or the Internet Mail Access Protocol ("IMAP," the most popular version of which is version four or "IMAP4")—is utilized to forward messages to the querying client. Both POP3 and IMAP4 deliver all available messages to the querying client.

Enterprises frequently utilize one or more "general" e-mail accounts, accounts which are not intended to provide communications to any specific individual employee of the enterprise and which are usually monitored by multiple individuals. Examples include "help" or customer service accounts and sales inquiry/order accounts. E-mail messages to such accounts may be distributed to individuals among a plurality of enterprise employees designated to respond to such messages based on individual efforts to retrieve such message. Thus, when an enterprise POP3 server is queried for messages received at an enterprise's general e-mail account, available messages are usually forwarded to the individual checking the account. Because the POP3 and IMAP4 protocols deliver all available messages when queried, however, one individual retrieving messages from the general e-mail account may get deluged with messages while the next individual to check the account receives none.

One proposal for distributing e-mail messages from a general account to a plurality of individuals involves forwarding individual messages to the e-mail addresses of the enterprise employees designated to respond to such messages. However, this solution may require that a large number of e-mail accounts be set up and maintained, with the attendant requirements of conditioning e-mail servers to recognize all of the addresses. Additionally, when messages to an enterprise customer service account are being distributed in the manner described above, a customer's e-mail message may not be forwarded to the same employee to whom a previous e-mail message from that customer regarding the same subject matter was forwarded. Thus, each employee receiving an e-mail message from the customer must learn the circumstances prompting the customer to send a message, which is inefficient for both the enterprise and the customer where the customer sends multiple messages regarding the same subject matter to an enterprise general account.

It would be desirable, therefore, to provide a method for intelligent distribution of e-mail messages received at an enterprise general e-mail account among a plurality of enterprise employees designated to handle such messages. It would be advantageous if the distribution mechanism avoided establishing individual e-mail addresses for each employee designated to respond to e-mail messages received at a general account. It would further be advantageous if the distribution mechanism permitted messages received from the same customer regarding the same subject matter to be forwarded to the same employee among the group of designated employees.

SUMMARY OF THE INVENTION

A message center server retrieves e-mail messages from one or more e-mail accounts and intelligently distributes them among a plurality of agents handling the messages. Messages received from the same originator regarding the same subject matter are treated as transactions and assigned a unique transaction identifier. When a message initiating a new transaction is forwarded to an agent, the agent's login is associated with the transaction identifier for that message. Thereafter, messages retrieved from the e-mail account(s) are scanned for a transaction identifier. If found, the message—a continuance of the transaction—is placed in the appropriate agent queue. The same agent thus handles all messages from the originator regarding a specific transaction, avoiding the need to relearn a transaction history. If no transaction identifier is found, the message is forwarded to an appropriate pool of new messages.

Agents retrieve messages from a pool by a fetch request, which includes a fetch count or minimum number of messages desired. Agents may thus retrieve a number of messages, work offline preparing responses, and reconnect to dump the prepared responses back to the message center server. Messages from an agent's queue—transaction continuances—are forwarded first in response to a fetch request, followed by the oldest new messages from a designated pool. Also, transactions continuances may be returned to the pool if the assigned agent is not logged in, ensuring that messages are handled within a required time frame. Performance indicators such as the number of agents available, the number of messages being handled by an agent, and the number of new messages in a pool may be monitored by supervisors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
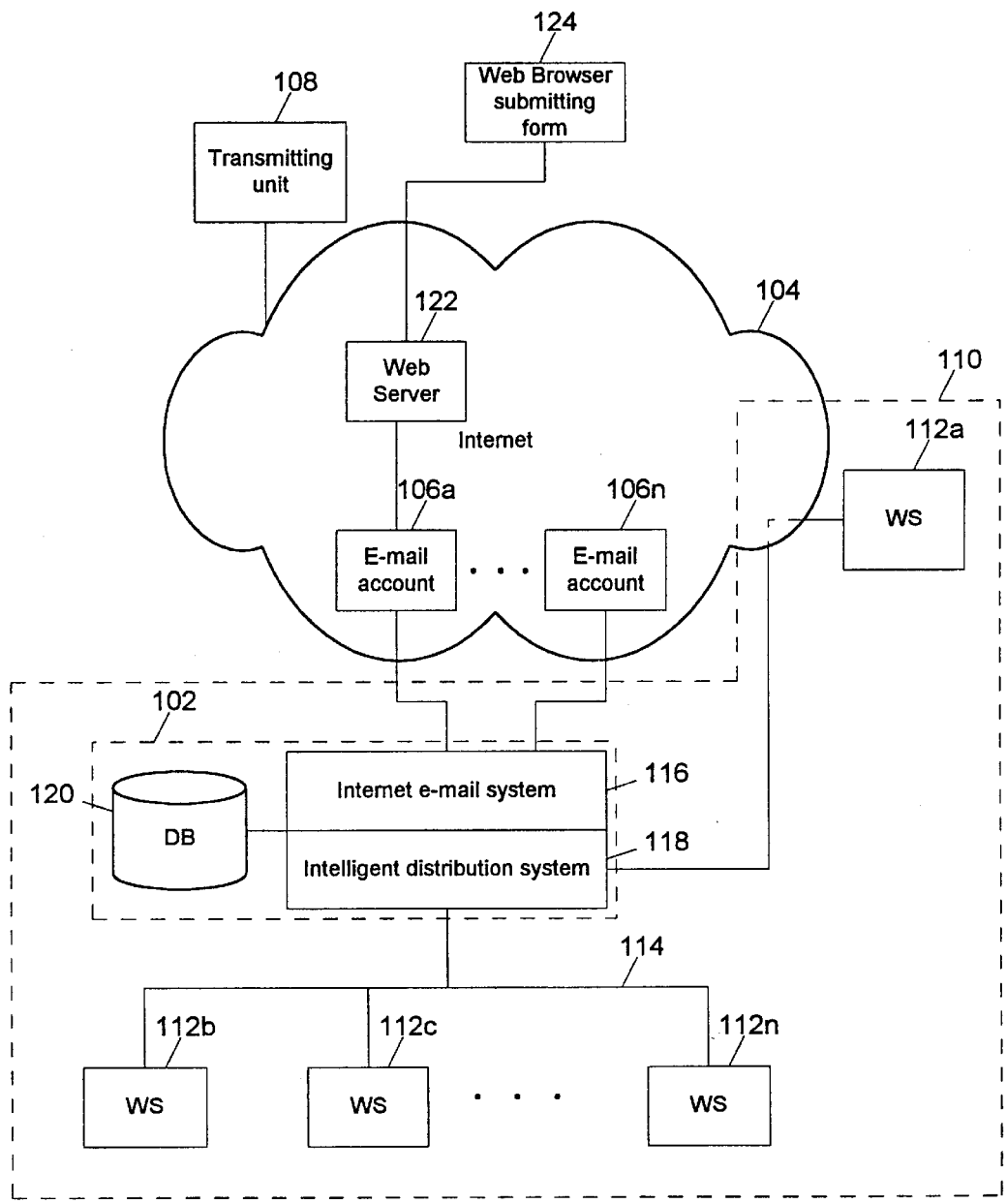
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. The network in which the present invention may be implemented includes a message center 102, which maybe implemented within a server for an enterprise. Message center server 102 may be connected to the Internet 104 via a firewall and a proxy, as is known in the art. One or more e-mail accounts 106a–106n within Internet 104 receive e-mail messages addressed to an enterprise, and may comprise a help account, a customer service account, an order collection account, or the like. E-mail messages received at e-mail accounts 106a–106n may originate, for example, from a transmitting unit 108 connected to Internet 104 utilizing any conventional e-mail utility designed to support transmission of e-mail over the Internet 104 such as Calypso E-mail client, a product of Micro Computer Systems, Inc, located in Irving, Tex.

In accordance with a preferred embodiment of the present invention, e-mail accounts 106a–106n are accessed by a plurality of individuals. E-mail accounts 106a–106n may be an enterprise help account for answering questions entered by a customer in transmitting unit 108 or, alternatively, a sales order collection account for aggregating and submitting sales orders entered in transmitting unit 108 by a salesman for the enterprise. The present invention may also be implemented for any other circumstance where a plurality of individuals retrieve messages from e-mail accounts 106a–106n.

Message center 102 retrieves messages from e-mail accounts 106a–106n and intelligently distributes them among a plurality of users within intranet 110. As used herein, the term "intranet" refers to infrastructure of the Internet 104 which is utilized for the purposes of a specific enterprise. Thus, users within intranet 110 may connect to message center server 102 by logging on from a workstation 112a connected through Internet 104. Also, users within intranet 110 may log on to message center server 102 from workstations 112b–112n connected to server 102 via a local area network (LAN) 114. LAN 114, if utilized, employs proprietary communication software for communications between workstations 112b–112n and message center server 102.

Message center server 102 includes an Internet e-mail system 116, an intelligent distribution system 118, and database 120. Internet e-mail system 116 operates in accordance with conventional e-mail protocols such as SMTP, POP3, and IMAP4 to retrieve and send all available messages from e-mail accounts 106a–106n when checked. E-mail messages thus retrieved are pooled within intelligent distribution system 118 and distributed among users connected via intranet 110. Message center server 102 utilizes an Internet address and a "well-known port number" known to workstation software employed to connect to server 102. That workstation software, run on workstation 112, transmits a log on request to server 102 from anywhere within intranet 110. Based on the log on/password sign-on submitted in the connection request from a user, a profile for the user is accessed and the user is granted associated rights to message center server 102, as described in further detail below.

Database 120 within message center server 102 contains, among other things, profiles for users authorized to connect to message center server 102, pools of messages retrieved from e-mail accounts 106a–106n, histories of both pending and closed transactions, address books employed by users, and libraries of standard replies. These and additional features are described in further detail below.

Electronic messages received by message center 102 may include forms of formatted data, i.e., forms (messages) transmitted by a Web server 122 within the Internet 104, where the form was originally submitted by a browser 124.

Message center 102 includes capabilities for handling such formatted data.

Figure 2:
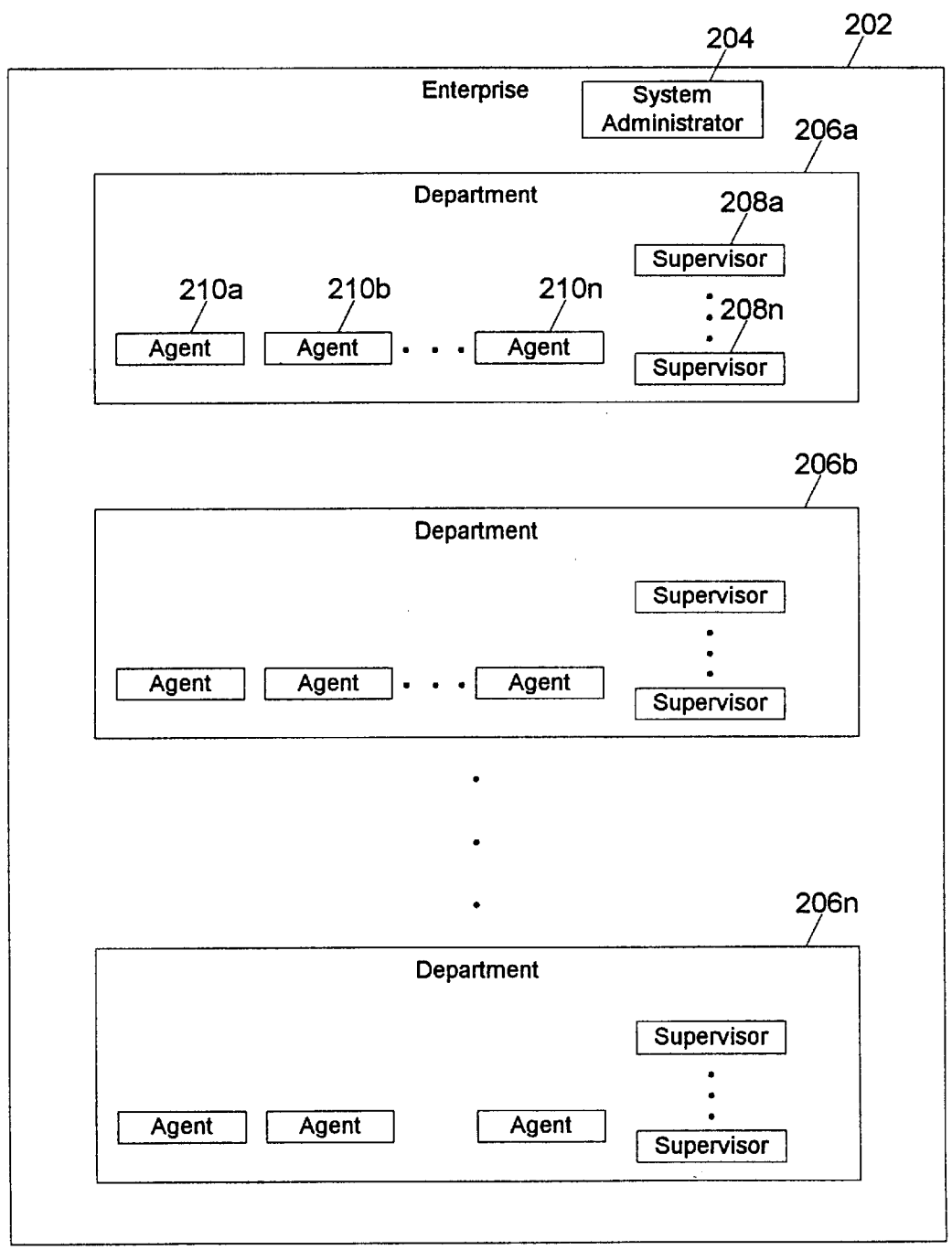
FIG. 2 is a logical block diagram for implementation of users monitoring e-mail account(s) via a message center in accordance with a preferred embodiment of the present invention.

Referring to FIG. 2, a logical block diagram for implementation of users monitoring e-mail account(s) via a message center in accordance with a preferred embodiment of the present invention is illustrated. E-mail messages, received at an enterprise general account or account(s) and which are to be distributed among a plurality of users by the message center, form department pool 202. A system administrator 204 defines departments 206a–206n, which may or may not correlate to organizational departments within the enterprise, and maps one or more e-mail account(s) from the accounts 106a–106n depicted in FIG. 1 which are being serviced by the message center to each department. Each e-mail account may be mapped to only one department, although each department may have more than one e-mail account mapped to it.

System administrator 204 also establishes supervisors 208a–208n for each department, creating profiles granting supervisors 208a–208n rights and defining the enterprise employees which are to serve as department supervisors by login/password combinations. Each department may include multiple supervisors, and a particular supervisor may be assigned to more than one department. Each department also includes a plurality of agents 210a–210n, which are defined by login/password combinations assigned to enterprise employees by system administrator 204 and are selected for a particular department 206a–206n by a supervisor 208a–208n for that department. Agents 210a–210n may also be included within multiple departments.

Supervisors 208a–208n administer and monitor the department or departments to which they are assigned. In addition to selecting agents to service e-mail messages for the department, a supervisor may create and update a library of standard replies which may be utilized by an agent. For example, when further information is required to answer a customer inquiry or an initial action may solve the customer's problem, the agent may select an appropriate standard response from the library for transmission as a reply to the e-mail message. A department supervisor may configure filters utilized by the message center to further refine routing patterns based on whether to discard the message, redirect the message, auto respond, save address, etc. The supervisor may also define the address book of e-mail addresses to which agents may send messages independent of responding to received messages.

A department supervisor may monitor a number of continuously updated performance indicators of a department's operations, including, for instance, the number of agents currently logged on for the department and the number of messages waiting for distribution to the department at the message center server. Department supervisors may also monitor the number of messages being handled by each agent, who may retrieve a number of messages from the server and send the responses back to the server for transmission to the originators of the e-mail messages. Other aspects of message center operations relating to a department may be similarly monitored by a department supervisor.

With reference now to FIGS. 3A–3E, high level flowcharts for processes of performed within a message center in accordance with a preferred embodiment of the present invention is depicted. The processes depicted may be implemented within a mail server functioning as a message center in accordance with the invention.

Figure 3A:
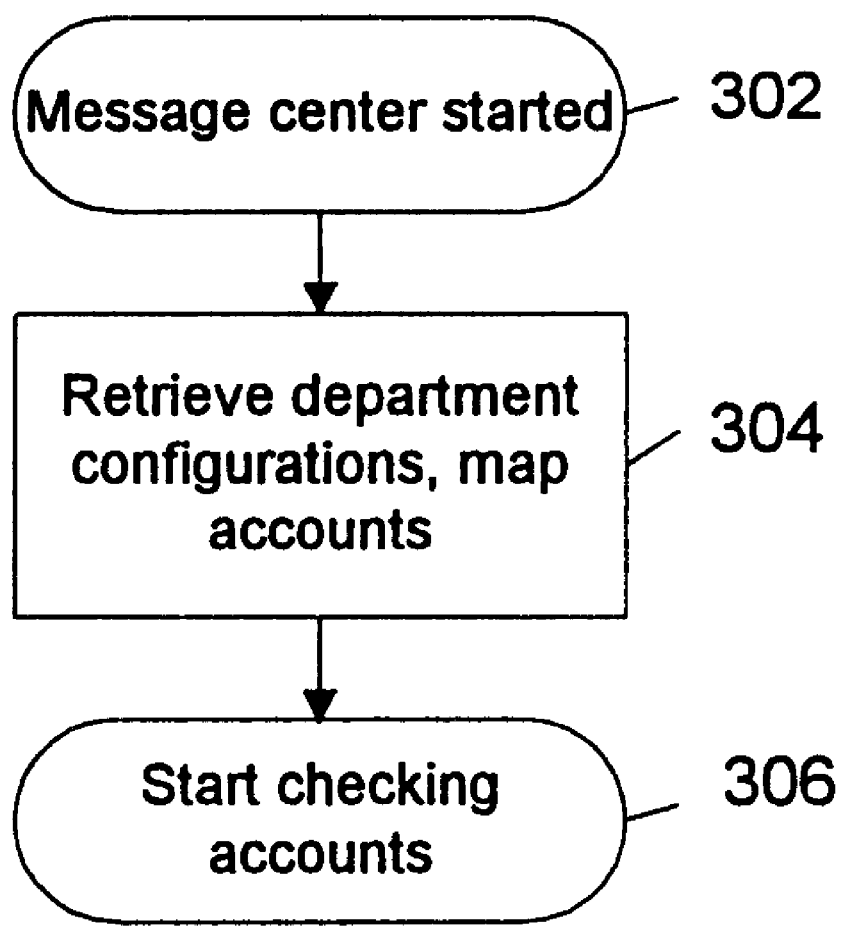
FIGS. 3A–3E depict high level flowcharts for processes of employing a message center in accordance with a preferred embodiment of the present invention.

FIG. 3A depicts a process for initializing a message center. The process begins at step 302, which depicts the message center being started. The process then passes to step 304, which illustrates retrieving the department configurations served by the message center and mapping the e-mail accounts served to the departments. The process next passes to step 306, which depicts starting to check the accounts periodically and sending mail to the appropriate locations, if needed.

Figure 3B:
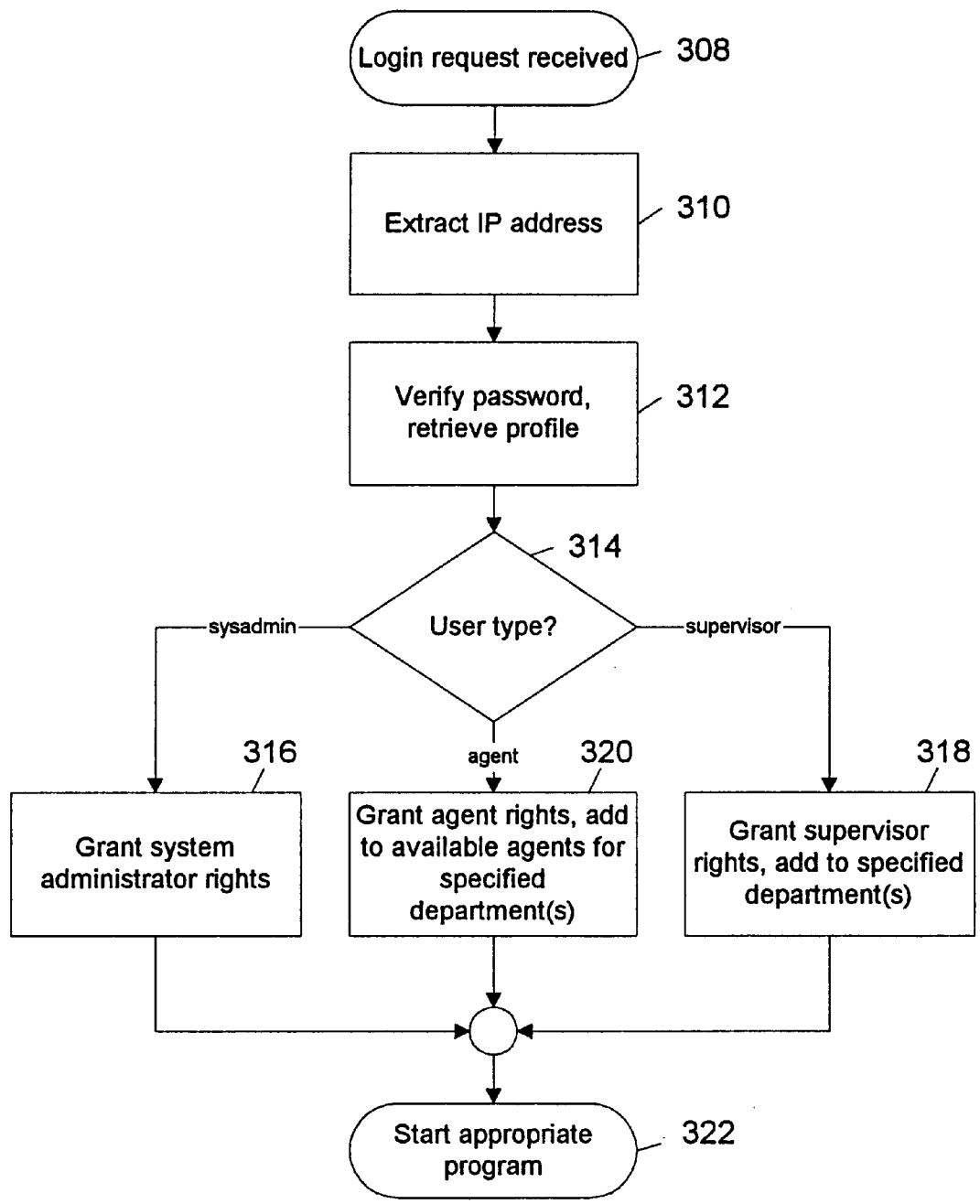

FIG. 3B depicts a process for logging in users to a message center. The process begins at step 308, which illustrates receiving a login request. The process then passes to step 310, which depicts extracting the Internet protocol address and port number of the connection from which the user is attempting to log in. This information is utilized to establish a communications path over the Internet (or a local network employing TCP/IP protocols) to the user, through which messages may be transmitted in a proprietary protocol. The process next passes to step 312, which illustrates verifying the password of the user and retrieving the user's profile, and then to step 314, which depicts determining the user type from the user profile. Users may be the system administrator, a department supervisor, or an agent for one or more departments.

If the login and password of the user are associated with the system administrator, the process proceeds to step 316, which illustrates granting the user system administrator rights. The user may then configure departments, set supervisors and their rights, add agents, and perform other functions as described earlier. If the user login and password are those of a supervisor, the process proceeds instead to step 318, which illustrates granting the user supervisor rights and adding them to the specified department(s) for which they are designated as supervisors. As supervisors, the user may then select agents for the department, set the agents rights, monitor department operations, and perform other functions as earlier described. If the user login and password are those belonging to an agent, the process proceeds to step 320, which depicts granting the user agent rights and adding them to the available agents for the specified department(s). From any of steps 316, 318, or 320, the process passes to step 322, which illustrates starting the appropriate workstation program (agent, supervisor, or system administrator) for the user.

Figure 3C:
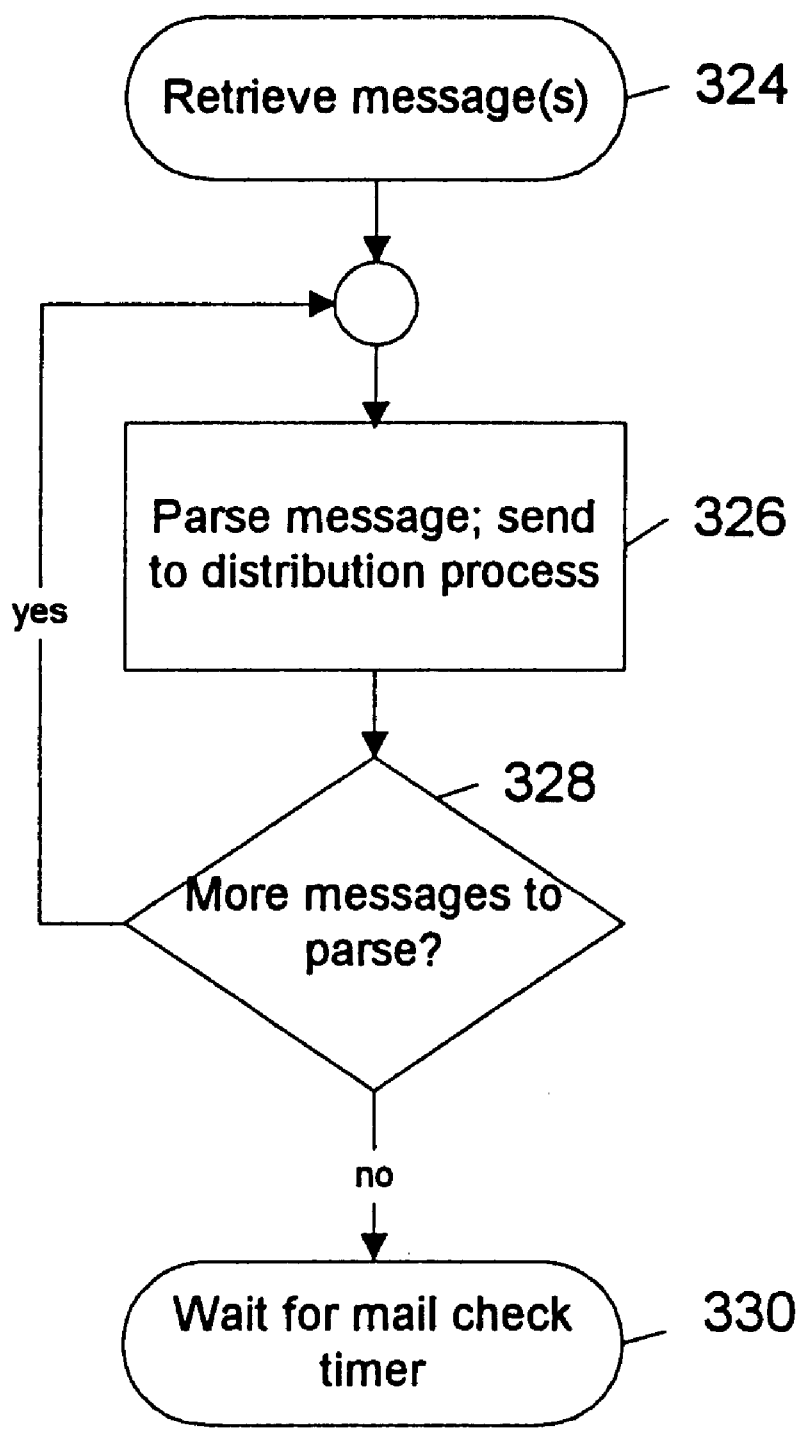

FIG. 3C depicts a process for preparing messages for distribution in a message center. The process begins at step 324, which illustrates retrieving all available messages from the e-mail account or accounts from which messages are to be distributed. The process next passes to step 326, which illustrates parsing a message for distribution, and then to step 328, which depicts a determination of whether additional messages require parsing for distribution. If so, the process returns to step 326 to parse the next message. Otherwise, however, the process proceeds instead to step 330, which illustrates the process becoming idle while waiting for the mail check timer to elapse, at which time the process will again restart at step 324.

Figure 3D:
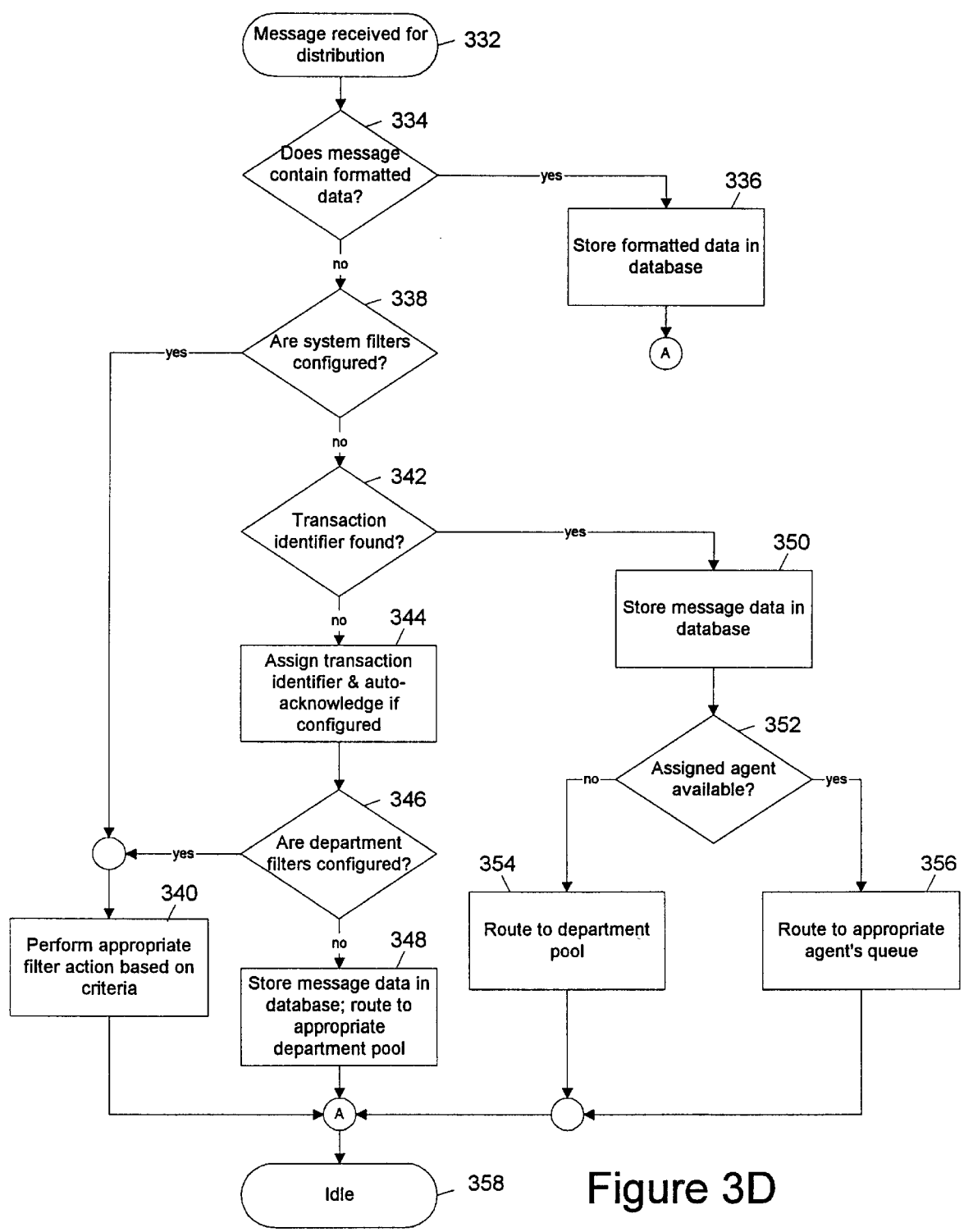
Figure 3E:
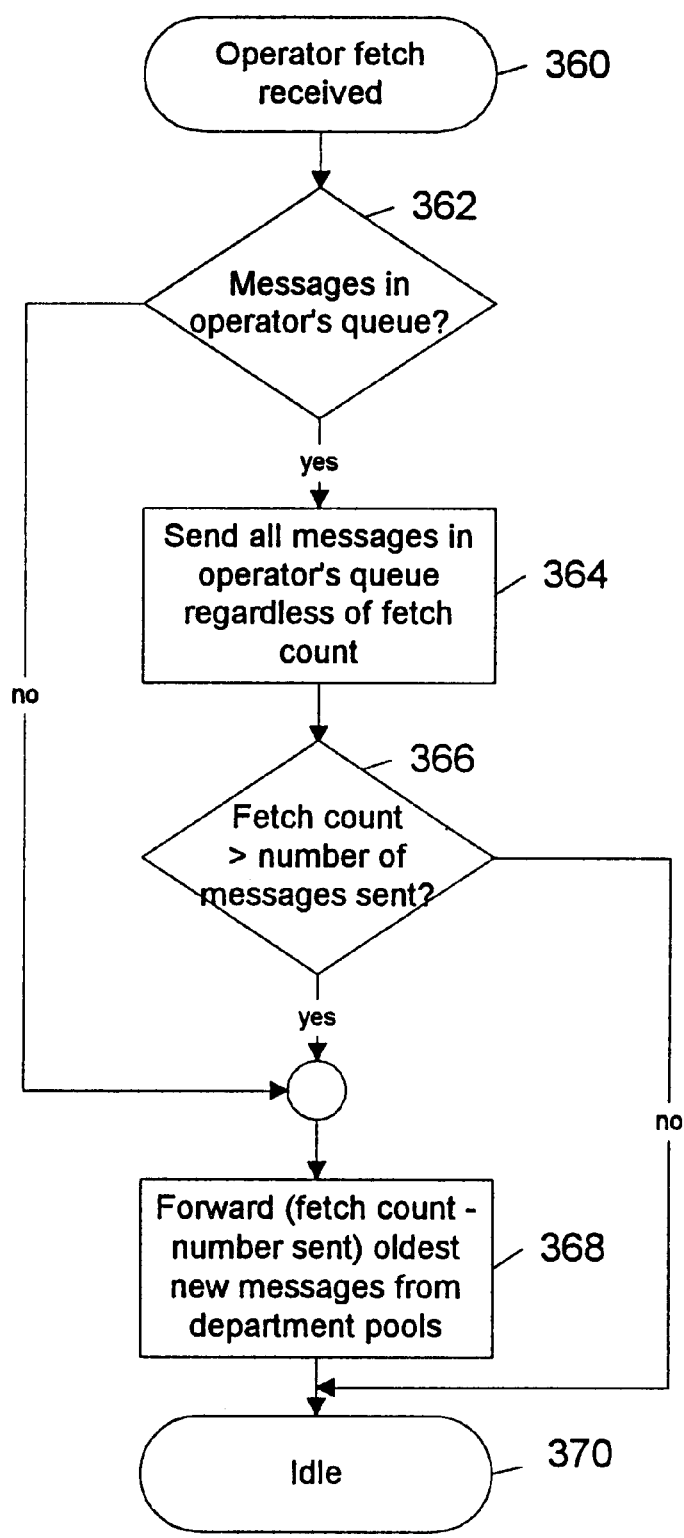

FIG. 3D depicts a process for message distribution in a message center. The process begins at step 332, which depicts a message being received for distribution. The process first passes to step 334, which illustrates a determination of whether the received message contains formatted data, indicating that the data comprises a form submitted by a user. If so, the process proceeds to step 336, which depicts storing the formatted data in the database. Forms may be handled differently than e-mail messages in the present invention.

Referring back to step 334, if the message received does not contain formatted data, the process proceeds instead to step 338, which illustrates a determination of whether there are any system filters configured. Filter definitions perform various actions on incoming mail messages and may be employed at either the system level, the department level or both, to manage incoming mail. Filters may archive or print messages, save the originating address of the message, auto-respond to the message or send the message to a plug-in process, route the message to a particular department or agent, redirect the message, or close a transaction thread.

Filter definitions are made up of user-specified rules identifying patterns to be looked for and actions to be taken upon detection. Examples include scanning the content of the message for keywords indicative of the nature of the inquiry, and thus of the department to which the message should be routed. For instance, where the departments include a sales department and technical support department, words such as "cost" or "price" or characters such as "$" would suggest that the message should be routed to the sales department rather than the technical help department.

As noted, the filters may route a message to a "plug-in", an additional mechanism for extending the functionality of the message center which may be implemented and overlaid with the message center functionality in the manner known in the art. Such plug-ins may provide special mechanisms for sorting, preprocessing, or otherwise handling incoming messages. For instance one plug-in might be implemented to determine if the message originator qualifies for support by determining, for example, whether the originator is listed in a database of customers which paid for support. This information may be appended to the message before the message is routed to an agent or department for handling.

If filters are configured at the system level, the process proceeds to step 340, which depicts performing an appropriate filter action on the message based on the specified criteria. The message may be later received back from a plug-in or other functional mechanism for routing.

If no filters are configured at the system level, the process proceeds instead from step 338 to step 342, which illustrates a determination of whether a transaction identifier is found within the message. Typically several messages and responses relating to a single subject matter (referred to herein as "transactions") will be required to solve a customer's problem or complete receipt of an order from an outside salesman. In order to maintain a thread through such messages and responses, a unique transaction identifier is assigned to the message initiating a new transaction. The originator of the message is asked to include this transaction identifier in the subject line of every subsequent message relating to the same subject matter. This allows a history of the transaction to be maintained and retrieved at any time, providing a method for maintaining the continuance of subsequent messages between the agent and customer. The transaction identifiers thus uniquely identify transaction threads regarding a specific subject with an particular message originator. Transaction identifiers are assigned to messages which commence a new thread and allow messages relating to a specific thread to be routed to a particular agent who has been previously involved with that transaction thread. Transaction identifiers also provide a mechanism for recreating a transaction history.

If no transaction identifier is found within the received message (i.e., the message is the start of a new thread), the process proceeds to step 344, which depicts assigning a transaction identifier to the message (and therefore to the new transaction thread) and returning an auto-acknowledge message confirming receipt to the originator, if this function is configured. The auto-acknowledge may both acknowledge receipt of the message and ask the customer to include the transaction identifier in subsequent messages or inquiries regarding the subject matter of this transaction.

The process then passes to step 346, which illustrates a determination of whether any department filters are configured. If so, the process proceeds to step 340, described above. Otherwise, the process proceeds instead to step 348, which depicts storing the message data within the message center database and routing the message to the appropriate department pool. From the appropriate department pool, the message will be retrieved for handling by an agent for the respective department on a first in, first out basis.

Referring back to step 342, if a transaction identifier is found within the message received for distribution, the process proceeds instead to step 350, which illustrates storing the message data in the message center database. The process then passes to step 352, which illustrates a determination of whether the agent associated with or assigned to the transaction thread to which the received message relates is available. An enterprise may wish to implement a policy of responding to incoming messages within a predetermined period, such as 1 hour, 24 hours, or 3 business days. To support this policy, the message center may check to determine whether the assigned agent is logged in, or when the expected agent is expected to again log in (specified by the agent when she last logged off).

If the assigned agent for the transaction thread identified by the transaction identifier is not available and/or not expected to be available, the process optionally proceeds to step 354, which illustrates routing the message to the appropriate department pool for handling by an agent whom is available. The agent who takes up this transaction thread may be provided with the transaction history in order to familiarize herself with the transaction.

If the option of handling messages within a specified time period is not enabled (steps 352 and 354 are not implemented) or the assigned agent is available (logged in or expected to log in with the specified time period), the process proceeds instead to step 356, which depicts routing the message to the appropriate agent's queue. Each agent has a queue in which are collected messages which are continuances of previous messages (i.e., portions of on-going transactions). These are collected and transmitted to the agent when messages are first requested when the agent logs in after a period of not being logged in.

From any of steps 336, 340, 348, 354, or 356, the process proceeds to step 358, which illustrates the process becoming idle. If another message is or has been received for distribution, the process will restart at step 332.

FIG. 3B depicts a process of distributing messages to a agent sending a fetch request to the message center. The process begins at step 360, which depicts receiving a fetch request from an agent. The fetch request will include a fetch count, the minimum number of messages which the agent wishes to receive. The process then passes to step 362, which illustrates a determination of whether there are messages in the requesting agent's queue. An agent's queue will contain messages having a transaction identifier for a transaction in which the agent was previously involved (i.e., messages from an originator to which the agent has previously sent a response, regarding the same subject matter as the previous response).

If the agent's queue is empty, the process skips to step 368, described below. If there are messages within the requesting agent's queue, however, the process passes instead to step 364, which depicts sending all messages in the requesting agent's queue to the agent, regardless of fetch count. If there are more message in the queue than were requested, all messages in the queue are still forwarded to the requesting agent.

The process next passes to step 366, which illustrates a determination of whether the fetch count is greater than the number of messages sent to the requesting agent. If so, the process proceeds to step 368, which depicts sending a number of messages equal to the unfilled fetch count (the fetch count minus the number of messages sent from the agent's queue) to the agent, with the oldest new messages being selected from the department pool(s) of the department(s) to which the agent is assigned and forwarded to the agent. Where the agent's queue was empty when the fetch request was received, the number of messages selected from the department pool(s) and forwarded to the agent will be the fetch count if at least that many messages are contained within the department pool(s). After forwarding at least the requested number of messages, if available, the process passes to step 370, which illustrates the process becoming idle until another agent fetch is received.

In the distribution mechanism of the present invention, agents retrieve messages from the message center server, with continuances of old transactions being selected for forwarding to the agent first, then the oldest new transactions. When a message initiating a new transaction is forwarded to an agent, the agent's login is associated with the transaction identifier. Subsequent messages containing the same transaction identifier are then held in the agent's queue for that agent. In this manner, no effort need be wasted in relearning the history of the transaction in order to ascertain what response should be sent next. Supervisors may reassign transactions from one agent within a department to another, or to another department pool, when necessary due to absence, etc. Messages and responses are not maintained locally on a workstation employed by an agent, but are maintained in the message center server so that a transaction history is available to any supervisor for the department or agent assigned to handle the transaction.

Figure 4:
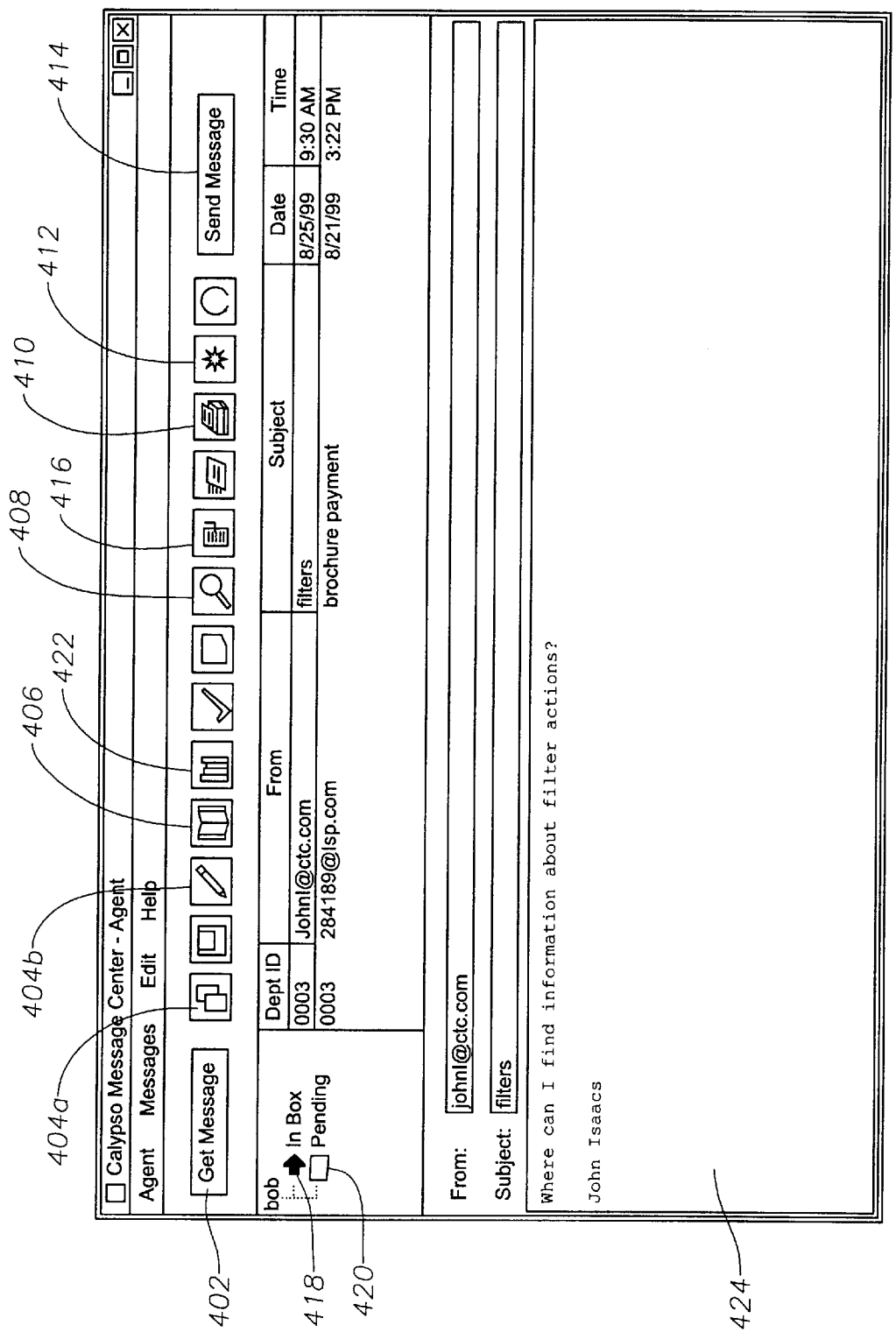
FIG. 4 is a block diagram of an agent user interface to a message center in accordance with a preferred embodiment of the present invention.

Referring to FIG. 4, a block diagram of an agent user interface to a message center in accordance with a preferred embodiment of the present invention is illustrated. The diagram is not intended to depict an actual user interface, but merely to illustrate the functionality included in the user interface for an agent handling messages distributed from a message center in accordance with the present invention. It is preferable that the functionality of the agent user interface be limited to that required to efficiently handle messages.

In the exemplary embodiment, the agent user interface includes a fetch ("Get Messages") control 402 for requesting that messages be forwarded to the agent. The user interface also includes a reply control 404*a* and a compose control 404*b* for composing a new message. An address book control 406 brings up a list of available addresses to which messages may be sent by the agent, allowing the agent to submit an inquiry to an expert or supervisor when the agent is unable to respond to the incoming message without assistance. A redirect control 416 allows the agent to forward a message to a specialist, who may be the supervisor or an experienced or knowledgeable agent. Messages which were inadvertently forwarded to the wrong department might also be redirected using redirect control 416. The address list displayed in response to actuation of address book control 406 may be limited to containing the external e-mail addresses only of recipients designated for handling agent inquiries for the department.

A search control 408 may allow an agent to view the history of a transaction, identified by the transaction identifier or selected based on date or keyword searching. A print control 410 allows the agent to print a message, while a move to history control 412 allows the agent to move the message to history, if this did not occur automatically after a reply was sent or if no reply was required. Send control 414 allows the agent to send a designated response, either composed by the agent, selected from the library or both, to the originator of a message.

The user interface also includes an in-box control 418 which causes the (icons representing) incoming messages for which no response has yet been prepared to be displayed, a pending box control 420 which causes messages for which no response has yet been prepared to be displayed instead. The agent may move a message from the in-box to the pending box, for example, to consult with an expert. A library control 422 causes a list of the standard responses composed by a department supervisor to be displayed. In a graphical user interface, an agent might select a particular message or response within in-box 418, pending box 420, or library 422 simply by double-clicking on the icon. Since an arbitrary number of messages and responses may be required to complete a transaction, the transmission of a response to the message originator will remove the message from the agent's in-box 418, but will not, by default, close the transaction. This should be done by the supervisor utilizing a close control (not shown). However, a message aging function may be configured to close and delete the message when a specified time period has passed. The exemplary user interface also includes a region 424 for viewing messages and/or composing responses.

The present invention provides an efficient mechanism for distributing e-mail message from an enterprise general account to a plurality of users designated to handle such messages. A "telemarketing" or "agent assistance" approach to answering customer inquiries or collecting outside sales orders may this be employed. The message center mechanism is designed to facilitate high volume handling of "single purpose" messages (i.e., customer service or sales order collection), maximizing the efficiency of agents dealing with such messages by providing tools which expedite that task while eliminating additional functionality which might distract the agent from the task. The Internet is utilized to transmit a private communication between the message center server and the agent's workstation, which may be part of the enterprise LAN or may be located within the agent's residence. Department supervisors may monitor operations, and the message center may be configured to generate alerts when, for example, a department's message pool exceeds a specified threshold, the age of messages in an agent's in-box exceeds a specified time, etc.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing media used to actually carry out the distribution. Examples of computer usable media include: recordable type media such as floppy disks and CD-ROMs and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of routing electronic messages, comprising:
   retrieving at least one electronic message;
   scanning the at least one electronic message for information uniquely identifying a transaction thread to which the electronic message relates;
   responsive to detecting information uniquely identifying a transaction thread within the at least one electronic message, routing the at least one electronic message to a specific agent associated with the transaction thread; wherein
   the information uniquely identifying a transaction thread comprises a transaction identifier, the method further comprising:
      responsive to detecting no transaction identifier within the at least one electronic message:
         assigning a unique transaction identifier to the at least one electronic message;
         automatically transmitting a response to an originator of the at least one electronic message acknowledging receipt of the at least one electronic message; and
         routing the at least one electronic message to a selected department within a plurality of specific departments associated with a general account from which the at least one electronic message was retrieved.

2. The method of claim 1, wherein the step of retrieving at least one electronic message further comprises:
   retrieving the at least one electronic message from a general account, the general account having a plurality of associated specific accounts for agents preparing responses to messages received at the general account.

3. The method of claim 1, wherein the step of scanning the at least one electronic message for information uniquely identifying a transaction thread to which the electronic message relates further comprises:
   scanning the at least one electronic message for an embedded transaction identifier uniquely identifying a transaction history associated with the transaction thread.

4. The method of claim 1, further comprising:
   responsive to an agent associated with the transaction identifier connecting to a system routing the at least one electronic message, forwarding the at least one electronic message to the agent.

5. The method of claim 1, wherein the step of routing the at least one electronic message to a selected department within a plurality of specific departments associated with a general account from which the at least one electronic message was retrieved further comprises:

routing the at least one message on a first in, first out basis relative to other messages received at the general account without a transaction identifier to an agent preparing responses to messages received at the general account and requesting messages requiring responses.

6. The method of claim 1, further comprising:

routing a plurality of messages without a transaction identifier received at the general account to an agent requesting messages requiring responses.

7. A system for routing electronic messages, comprising:

a message server retrieving at least one electronic message for a general account having a plurality of associated specific accounts for agents preparing responses to messages received at the general account;

a distribution facility within the message server scanning the at least one electronic message for a transaction identifier uniquely identifying a transaction thread to which the electronic message relates;

a router within the message server routing the at least one electronic message to a specific account within the plurality of specific accounts which is associated with the transaction thread upon detecting the transaction identifier within the at least one electronic message; wherein the router, upon detecting no transaction identifier within the at least one electronic message:

assigns a unique transaction identifier to the at least one electronic message;

automatically transmits a response to a sender of the at least one electronic message acknowledging receipt of the at least one electronic message; and routes the at least one electronic message to a selected account within a plurality of specific accounts associated with a general account from which the at least one electronic message was retrieved.

8. The system of claim 7, wherein the router routes all messages received at the general account which contain a transaction identifier associated with the specific account to the specific account.

9. The system of claim 7, further comprising:

a database coupled to the distribution facility containing a transaction history associated with the transaction thread and selectively providing the transaction history to an agent.

10. The system of claim 7, wherein the distribution facility forwards the electronic message to an agent assigned to the specific account together with all other electronic messages including a transaction identifier associated with the specific account in response to the agent requesting messages requiring responses.

11. The method of claim 7, wherein the distribution facility routes messages without a transaction identifier received at the general account to the specific account on a first in, first out basis.

12. The system of claim 7, further comprising:

a workstation connecting an agent assigned to the specific account to the message server.

13. A computer program product within a computer usable medium for routing electronic messages, comprising:

instructions for retrieving at least one electronic message from a general account having a plurality of associated specific accounts for agents preparing responses to messages received at the general account;

instructions for scanning the at least one electronic message for a transaction identifier uniquely identifying a transaction thread to which the electronic message relates;

instructions, responsive to detecting the transaction identifier within the at least one electronic message, for routing the at least one electronic message to a specific account associated with the transaction thread;

instructions, responsive to detecting no transaction identifier within the at least one electronic message, for:

assigning a unique transaction identifier to the at least one electronic message;

automatically transmitting a response to a sender of the at least one electronic message acknowledging receipt of the at least one electronic message; and routing the at least one electronic message to a selected account within a plurality of specific accounts associated with a general account from which the at least one electronic message was retrieved.

14. The computer program product of claim 13, wherein the instructions for retrieving at least one electronic message further comprise:

instructions for retrieving the at least one electronic message from a general account having a plurality of associated specific accounts for agents preparing responses to messages received at the general account.

15. The computer program product of claim 13, wherein the instructions for scanning the at least one electronic message for a transaction identifier uniquely identifying a transaction thread to which the electronic message relates further comprise:

instructions for scanning the at least one electronic message for an embedded transaction identifier uniquely identifying a transaction history associated with the transaction thread.

16. The computer program product of claim 13, further comprising:

instructions, responsive to an agent assigned to the specific account connecting to a system routing the at least one electronic message, for forwarding the electronic message to the agent together with all other electronic messages including a transaction identifier associated with the specific account.

17. The computer program product of claim 13, wherein the instructions for routing the at least one electronic message to a selected account within a plurality of specific accounts associated with a general account from which the at least one electronic message was retrieved further comprise:

instructions for routing the at least one message on a first in, first out basis relative to other messages without a transaction identifier received at the general account to an agent preparing responses to messages received at the general account and requesting messages requiring responses.

* * * * *